United States Patent [19]
Philibert

[11] 3,885,821
[45] May 27, 1975

[54] EXPANSION FITTING

[75] Inventor: Robert A. Philibert, Burlington, Conn.

[73] Assignee: General Signal Corporation, Rochester, N.Y.

[22] Filed: Dec. 5, 1973

[21] Appl. No.: 421,882

[52] U.S. Cl. ............... 285/175; 29/437; 29/508; 29/516; 285/302; 285/348; 285/382; 403/104
[51] Int. Cl. ............................................. F16l 55/00
[58] Field of Search ........... 285/302, 175, 380, 165, 285/115, 347, 330, 382, 169, 234, 298, 285/382.5, 348, 424, 334.5; 403/104, 300; 29/437, 508, 516

[56] References Cited
UNITED STATES PATENTS
2,017,717  10/1935  Heeter ........................ 285/348 X FOREIGN PATENTS OR APPLICATIONS
297,599    5/1917   Germany ......................... 285/382
664,710    1/1952   United Kingdom ................. 285/110
806,481   12/1958   United Kingdom ................. 285/382
1,809,491 11/1968   Germany ....................... 285/382.2

Primary Examiner—Richard J. Scanlan, Jr.
Assistant Examiner—Moshe I. Cohen
Attorney, Agent, or Firm—Milton E. Kleinman; Harold S. Wynn; John F. Ohlandt

[57] ABSTRACT

An expansion fitting specifically designed for use with electrical metallic tubing (EMT), such fitting allowing for sliding of the tubing in response to the expansion and contraction involved with extended runs of the tubing.

5 Claims, 2 Drawing Figures

EXPANSION FITTING

BACKGROUND OBJECTS AND SUMMARY OF THE INVENTION

The present invention relates to electrical equipment and, more specifically, to an expansion fitting especially adapted for coupling for interconnecting electrical metallic tubing known as EMT.

It has become a common practice in large scale installations, involving extended runs of conduit and the like, to employ what are known as expansion fittings for coupling or interconnecting pieces of conduit so as to allow for sliding of such conduit when the material thereof expands or contracts with temperature as determined by its co-efficient of expansion.

The National Electrical Code requires expansion fittings at all structural expansion joints in concrete slabs, and also at building expansion joints.

Electrical metallic tubing is also known as thin wall tubing because it is thinner than rigid conduit which has a thickness of Schedule 40 Pipe. Intermediate Grade conduit is now being introduced which is midway between rigid and thin wall tubing.

Although it has been known heretofore to produce an expansion fitting by utilizing casting methods of one type or another, it has been found that an expansion fitting of this character is not adequate for purposes of certain installations. In particular, because the casting method produces a cast expansion fitting whose outside diameter is approximately 2 inches, in cases where the conduit or tubing involved is ½ inch, such result is unsatisfactory in connection with projects in which the electrical metallic tubing is to be laid in very thin slabs. Typically, many installations call for slabs as thin as 2½ inches thick.

Accordingly, it is a primary object of the present invention to produce an expansion fitting that will be satisfactory on a variety of job installations, even those where concrete slab constructions are as thin as 2½ inches in thickness.

Another object is to produce an expansion fitting that is very simply and hence inexpensively achieved.

A more specific object of the present invention is to produce an expansion fitting in which the outside diameter of the fitting is on the order of 0.922 inches compared with a previously known outside diameter of 2 inches in applications to ½ inch tubing or conduit.

A more specific object is to provide a fitting capable of use without a bonding jumper, such bonding jumper being permitted by the National Electrical Code in those instances where the more conventional fitting must meet special test conditions.

Another specific object is to provide that the fitting possess sufficient thermal capacity to pass safely fusing current equal to the wire sizes specified by the National Electrical Code, which capability is now not recognized as a U.L. requirement but is expected to be a requirement in the future.

The above and other specific objects are realized by the primary feature of the present invention. This primary feature resides in the unique provision of electrical metallic tubing for the fabrication of the part, i.e., the expansion fitting, instead of using castings for this part or fitting.

The expansion fitting of the present invention accordingly comprises a pair of lengths of electrical metallic tubing, each having a predetermined diameter, and a sleeve of slightly larger diameter overlapping both of the adjacent end portions of each of the aforesaid lengths. In other words, the sleeve fits over these adjacent end portions. The total fitting is connected in a "run" i.e., in a typical installation of electrical metallic tubing, by the use of more conventional connectors or couplings; that is to say, connectors or couplings that do not allow for expansion of the electrical metallic tubing but otherwise serve the basic purpose.

In accordance with more specific features of the present invention, the electrical metallic tubing which constitutes the pair of lengths previously mentioned, that is, the part on either side of the sleeve member, have both of their ends flared inside of the fitting so as to prevent damage to the wire therein. Also, for the same fundamental purpose, both of these ends can be coated, for example, with a poly-vinyl chloride fluid bed insulation; alternately a suitable protective bushing could be inserted on to the EMT to provide the same function.

The sleeve member is of slightly larger diameter, being for example, the next larger size EMT, which, in the case of ½ inch for the pair of lengths, would be a ¾ inch size. On the rigid end of the fitting, as will become apparent as the description proceeds, the oversized sleeve member is crimped or rolled to provide a positive bond between the two parts. The bond is to support the fitting and to provide electrical continuity. On the other end, that is, on the telescoped end within the fitting, a split metal ring is provided. Over the reduced diameter portion of this split metal ring a gasket is utilized to act as a spring to force the split ring against the smaller diameter length of EMT. A gasket next to the ring provides a water-tight and concrete tight seal between the two tubing parts; that is, between the sleeve member and the length of EMT.

Other objects, advantages and features of the present invention will be appreciated by reference to the following detailed description taken in conjunction with the drawing.

Figure 1:
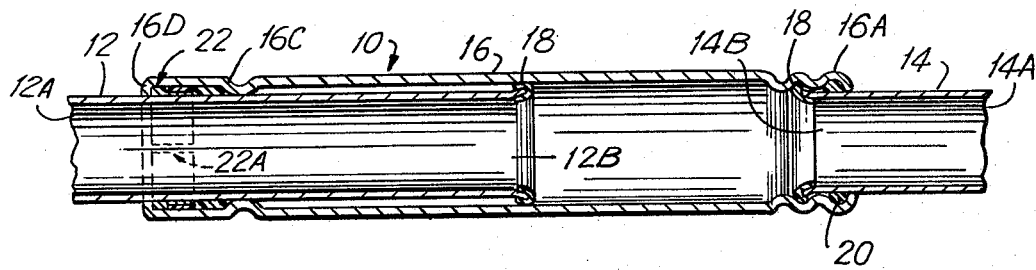
FIG. 1 is a cross-sectional view of the expansion fitting of the present invention.

DESCRIPTION OF PREFERRED EMBODIMENT:

Referring now to the figures of the drawing, there will be seen a preferred embodiment of the expansion fitting of the present invention. This expansion fitting is generally designated 10 and comprises a pair of lengths 12 and 14 of electrical metallic tubing (EMT), which tubing is well known to those skilled in the art and is also called thin wall tubing.

Each of the lengths 12 and 14 of EMT is suitably connected or coupled at its remote end 12A and 14A respectively by means of conventional EMT connectors or couplings (not shown).

A sleeve 16 of slightly larger diameter than the diameter of the lengths 12 and 14 is adapted to fit over the adjacent end portions of lengths 12 and 14, that is the end portions 12B and 14B. In the case where lengths 12 and 14 have a ½ inch size, the sleeve 16 would have a size of ¾ of an inch.

It will be seen that both of the ends 12B and 14B of the respective lengths 12 and 14 are flared and that they are illustrated as being covered with an insulation material 18. As previously indicated, this coating is for the purpose of preventing damage to any of the wires within the fitting. As also noted previously, individual bushings or grommets can alternately be provided at both of the flared ends.

At the rigid end of the fitting, that is, where the end 16A of the fitting 16 contacts the ends 14B of the length 14, the oversized sleeve 16 is crimped or rolled to provide a positive bond between the two parts. The bond also acts to support the fitting and to provide electrical continuity. It is generally preferable that a gasket be used in connection with the crimped end 16A. Thus, it will be seen that there is illustrated a gasket 20 placed behind the rigid crimp in the sleeve 16.

Use of such a gasket insures that this end of the fitting is water tight and also concrete tight. The same result can of course be accomplished without using such a gasket; however, in such event, much more precise crimping or rolling must be performed; hence, the use of a gasket is the preferred arrangement.

Figure 2:
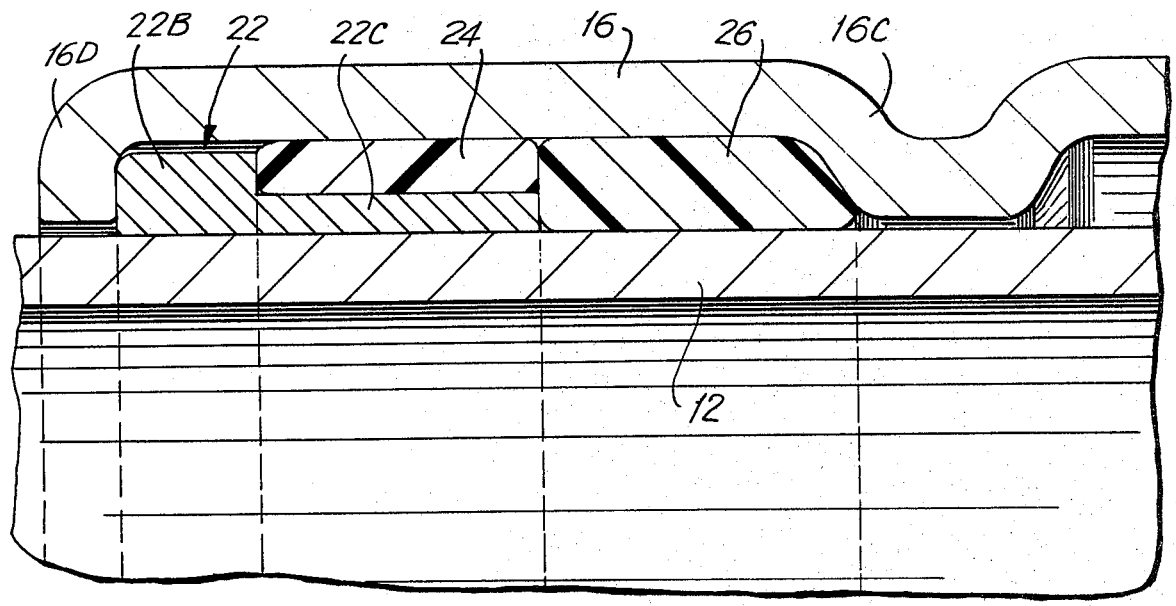
FIG. 2 is an enlarged sectional view of the telescoped end of the expansion fitting.

The other end of the fitting is telescoped, that is, this end is constructed to allow for the necessary expansion or contraction of the EMT in its extended run in the given installation. Accordingly, a sliding action is enabled by reason of the telescoping of the length 12 within the sleeve 16. At the same time, to make sure that this end of the fitting is also moisture tight, there is provided an assembly comprising a split metal ring 22. Such metal ring is provided with an axially directed gap 22A, the ring consisting of a portion at the left end, as seen in FIG. 2, which is of relatively larger diameter and is designated 22B, whereas the remaining portion 22C is of much smaller diameter. Surrounding the portion 22C and immediately abutting against the outer surface thereof is a gasket 24, which is preferably made of neoprene or the like.

This gasket 24 acts as a spring to force the split ring 22 against the tubing length 12.

Immediately next to, and to the right of, ring 22 is another gasket 26, which surrounds and abuts firmly against the tubular length 12 and also, at its outer surface, abuts firmly against and engages the inner surface of the sleeve 16. This gasket is also shaped to fit, at its right end, firmly against the crimped portion 16C of the sleeve 16. This gasket 26 serves to provide a moisture-tight seal between the tubular length 12 and the sleeve 16.

When the several parts of the fitting of the present invention are assembled at the factory or otherwise, the crimps or rolls previously mentioned are put into the fitting. Thus, the crimp previously discussed is fabricated at the right end of the sleeve 16 after the tubular length 14 has been inserted into the sleeve 16. Since the tubular length 14 is flared it would not otherwise pass easily into the sleeve.

Similarly, at the other end of the sleeve, the tubular length 12 is inserted within the sleeve 16 and thereafter the crimp 16C is formed in the sleeve. Then the several parts of the assembly at that end are inserted, that is to say, the gaskets 26, 24 and the split ring 22 are inserted and are removed against the crimp 16C.

Following this, the left end of the sleeve 16 is bent inwardly, as at 16D, against the split metal ring 22 so as to compress the gaskets 24 and 26. This assures firm contact between the split metal ring 22 and the outer tubular length 16, as well as firm contact between the ring 22 and the tubular length 12.

The expansion fitting of the present invention has been tested and found to comply with present day UL standards for such fitting. The fitting also fulfills the objects previously recited; that is; the specific objects of providing the capability for the fitting of being used without a bonding jumper and of providing thermal capacity so as to pass fusing current equal to the wire size as specified in the National Electrical Code.

Accordingly, there has been provided an extremely separate an inexpensive expansion fitting for electrical metallic tubing that completely fulfills known and anticipated electrical requirements; and, moreover, is extremely suitable and adaptable for application to installations in which the tubing must be laid in thin slabs of concrete and the like.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. An expansion fitting adapted for coupling or connecting electrical metallic tubing, comprising:
   a pair of lengths of electrical metallic tubing, each having substantially the same predetermined diameter;
   a sleeve of electrical metallic tubing having, substantially throughout its length, a diameter slightly larger than the diameter of the pair of lengths of tubing, the sleeve fitting over adjacent end portions of each of said lengths of tubing in overlapping relationship;
   the adjacent end portion of one length of tubing being in telescopic sliding relationship with one end of said sleeve, and the adjacent end portion of the other length being in rigid coupling relationship with the other end of said sleeve;
   the said telescoping relationship being defined by a moisture-tight, electrically continuous, assembly including a bent portion at said one end of the sleeve;
   a split metal ring engaged by said bent portion, said split metal ring having an axially extending gap at its circumference and being provided with a portion of relatively large diameter and a remaining portion of smaller diameter, gasket means surrounding the portion of smaller diameter, while abutting the smaller diameter end of the ring and engaging said one length of tubing; and
   further including a crimped portion at the one end of said sleeve, said crimped portion engaging said gasket means, said bent portion of said sleeve being bent inwardly and firmly engaging the end of the ring having the larger diameter.

2. An expansion fitting as defined in claim 1, in which said gasket means includes first and second individual gaskets, the first gasket surrounding the ring portion of smaller diameter, the second gasket abutting the end of said ring having the smaller diameter.

3. An expansion fitting as defined in claim 1, in which each of the adjacent end portions of said lengths of tubing is flared outwardly.

4. An expansion fitting as defined in claim 1, in which the rigid coupling relationship is defined by the flared end of said other length of tubing arrangement and contacting firmly with the other end of said sleeve.

5. An expansion fitting as defined in claim 1, in which said other end of said sleeve is crimped so as to engage with the flared end of said other length of tubing.

* * * * *